(12) United States Patent
Haishima

(10) Patent No.: US 7,664,988 B2
(45) Date of Patent: Feb. 16, 2010

(54) GAMING APPARATUS HAVING MEMORY FAULT DETECTION

(75) Inventor: Jun Haishima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 439 days.

(21) Appl. No.: 11/205,121

(22) Filed: Aug. 17, 2005

(65) Prior Publication Data

US 2006/0048008 A1    Mar. 2, 2006

(30) Foreign Application Priority Data

Aug. 25, 2004   (JP) .............................. 2004-245337

(51) Int. Cl.
*G06F 11/00*   (2006.01)
(52) U.S. Cl. ............................. 714/36; 713/2
(58) Field of Classification Search .............. 714/36, 714/27, 3, 5, 47; 710/104; 713/2
See application file for complete search history.

(56) References Cited

U.S. PATENT DOCUMENTS

| | | | | |
|---|---|---|---|---|
| 5,701,478 A | * | 12/1997 | Chen ............................. | 713/2 |
| 5,732,268 A | * | 3/1998 | Bizzarri ......................... | 713/2 |
| 5,860,122 A | * | 1/1999 | Owada et al. ................ | 711/162 |
| 5,864,698 A | * | 1/1999 | Krau et al. ...................... | 713/2 |
| 5,971,851 A | * | 10/1999 | Pascal et al. .................. | 463/24 |
| 6,011,564 A | * | 1/2000 | Furuhashi et al. ........... | 345/501 |
| 6,115,036 A | * | 9/2000 | Yamato et al. ............... | 715/723 |
| 6,393,559 B1 | * | 5/2002 | Alexander ....................... | 713/2 |
| 6,449,735 B1 | * | 9/2002 | Edwards et al. ................ | 714/25 |
| 2004/0078697 A1 | * | 4/2004 | Duncan ....................... | 714/42 |
| 2005/0246586 A1 | * | 11/2005 | Chang .......................... | 714/36 |
| 2007/0168738 A1 | * | 7/2007 | Wang ........................... | 714/36 |

FOREIGN PATENT DOCUMENTS

| | | |
|---|---|---|
| EP | 0 774 716 A1 | 5/1997 |
| EP | 0 801 387 A2 | 10/1997 |
| JP | 9-319445 | 12/1997 |
| JP | 2000-35888 | 2/2000 |
| JP | 2003-330793 | 11/2003 |
| JP | 2003-331236 | 11/2003 |

* cited by examiner

*Primary Examiner*—Dieu-Minh Le
(74) *Attorney, Agent, or Firm*—Oblon, Spivak, McClelland, Maier & Neustadt, L.L.P.

(57) ABSTRACT

An information processing device and associated methodology are provided for inspecting a program fault. A first memory stores a boot program executed when the information processing device is initiated for operation. A second memory device is provided for storing an application program. A control device executes a fault inspection program to inspect whether or not a fault has occurred in the second memory device. The fault inspection program is stored in the first memory device and is initiated upon initialization of the information processing device.

10 Claims, 3 Drawing Sheets

GAMING APPARATUS HAVING MEMORY FAULT DETECTION

CROSS-REFERENCE TO THE RELATED APPLICATION(S)

This application is based upon and claims a priority from the prior Japanese Patent Application No. 2004-245337 filed on Aug. 25, 2004, the entire contents of which are incorporated herein by reference.

BACKGROUND OF THE INVENTION

1. Field of the Invention

The present invention relates to an information process device in which a fault in hardware or software is inspected.

2. Description of Related Art

In a conventional information process device, data and programs required in calculation or control are stored in one memory area of a memory device such as a hard disk and a program for inspecting whether or not a fault such as damage, change or falsification occurs in the programs or data (hereinafter, abbreviated as "fault inspection program") is stored in the other memory area in the same memory device, as disclosed in Unexamined Japanese Publication No. 2003-331236.

Therefore, in a case that the damage occurs in the memory device, there is fear that the fault inspection program is also damaged. At that time, it cannot be guaranteed that the fault inspection program properly operates.

SUMMARY OF THE INVENTION

In order to dissolve the above problems, the present invention has been done and has an object to provide an information process device in which it can be guaranteed that a fault inspection program properly operates even if a fault occurs in a memory device which is inspected through the fault inspection program.

In order to accomplish the above object, according to one aspect of the present invention, it is provided an information process device comprising:

a first memory device for storing a boot program executed when the information process device is started to operate;

a mother board on which the first memory device is provided;

a second memory device for storing an application program, the second memory device being connected to the mother board;

a control device for executing a fault inspection program to inspect whether or not a fault occurs in the second memory device;

wherein the fault inspection program is stored in the first memory device; and wherein the control device executes the fault inspection program when the information process device is started to operate.

According to the information process device of the present invention, the fault inspection program is stored in the first memory device on the mother board which is independent from the second memory device, thereby even if the fault occurs in the second memory device, it can be guaranteed that the fault inspection program properly operates.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

Hereinafter, the embodiment according to the present invention will be described with reference to the drawings.

Figure 1:
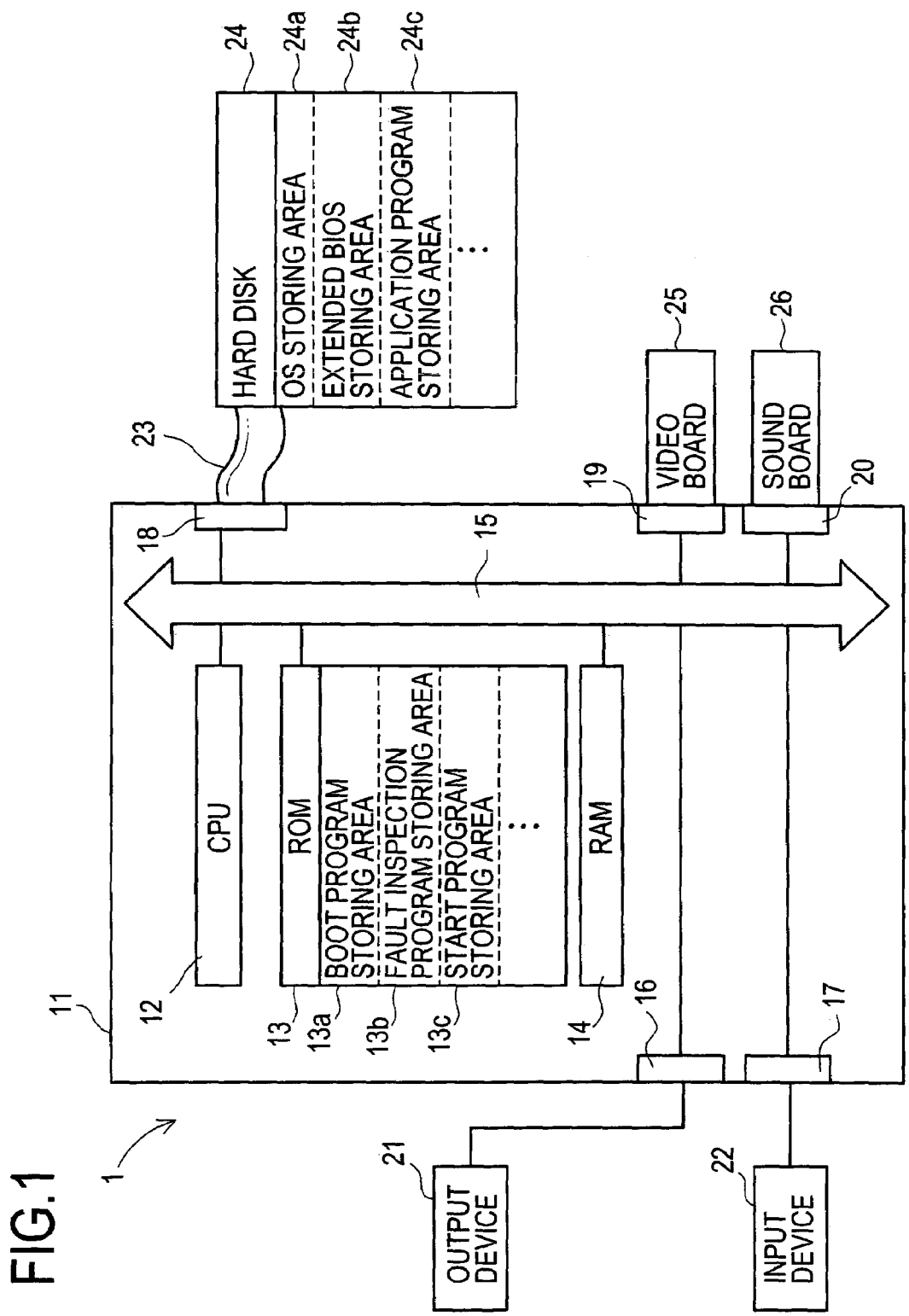
FIG. 1 is a block diagram of an information process device according to the embodiment.
Figure 3:
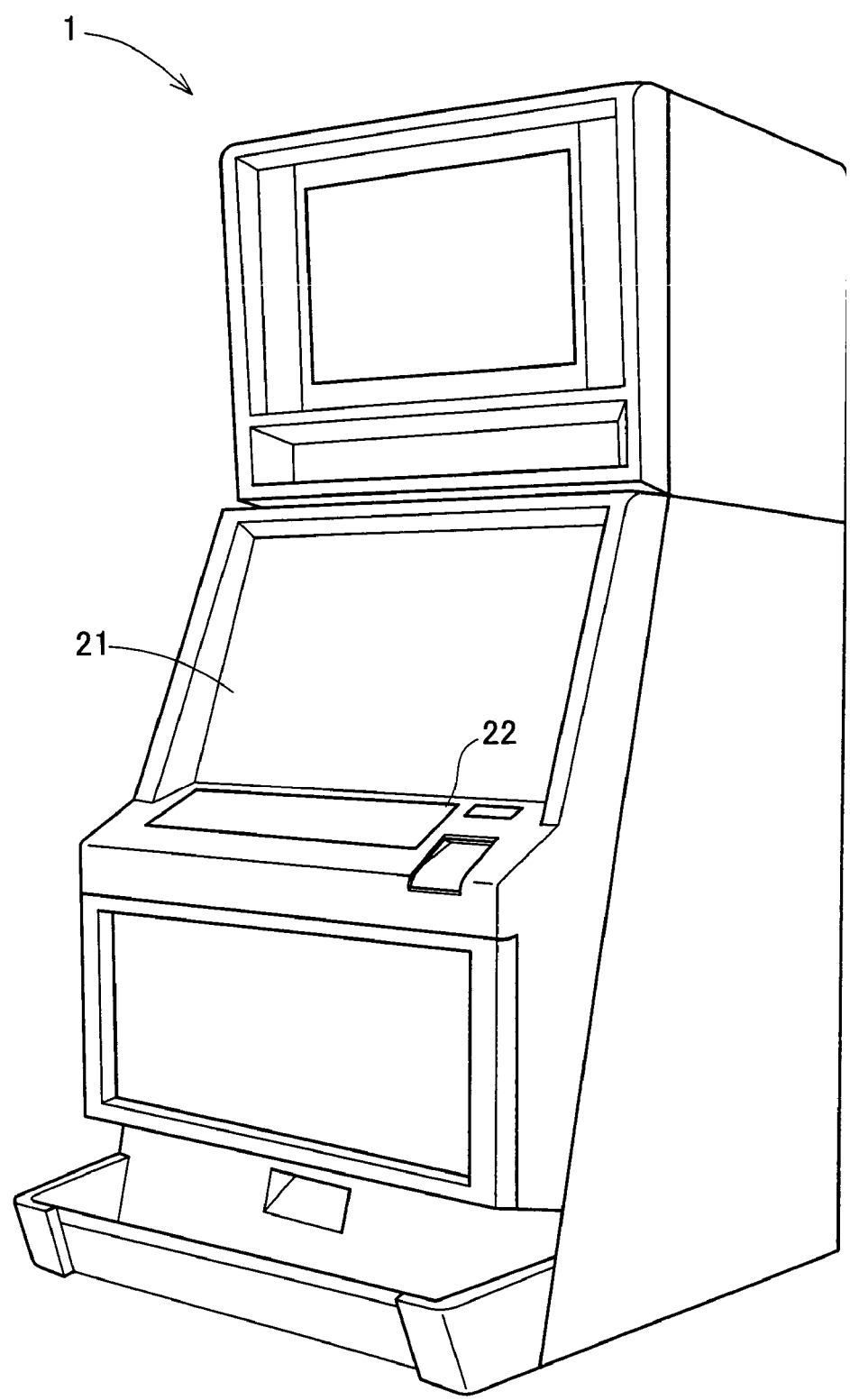
FIG. 3 is a perspective view of the information process device according to the embodiment.

FIG. 1 is a block diagram of the embodiment according to the present invention. FIG. 3 is a perspective view of an information process device of the embodiment. As shown in FIG. 3, although the information process device 1 is a gaming machine for business use, such gaming machine utilizes an operating system (OS) which is generally used in a personal computer on sale. And under an operation circumstances thereof, a game soft program stored in a hard disk mentioned later is operated.

And as shown in FIG. 1, in the information process device 1 according to the embodiment, a CPU 12, a ROM 13, a RAM 14, a bus 15, connectors 16, 17, a port 18, extended slots 19, 20 are provided on a mother board 11.

The CPU 12 controls the information process device 1 of the embodiment and executes various programs. Therefore, the CPU 12 corresponds to a control device.

And the ROM 13 is a nonvolatile memory in which various control programs are stored, such control programs being required when the information process device 1 of the embodiment is started to operate. The ROM 13 corresponds to a first memory device. And in the ROM 13, as shown in FIG. 1, a boot program storing area 13a for storing a boot program, a fault inspection program storing area 13b for storing a fault inspection program and a start program storing area 13c for storing a start program are formed.

Here, the boot program stored in the boot program storing area 13a, the fault inspection program stored in the fault inspection program storing area 13b and the start program stored in the start program storing area 13c will be described hereinafter.

Further, the RAM 14 is a memory for temporarily storing various data calculated when the CPU 12 executes programs.

The bus 15 is constructed from a PCI bus in which a bridge circuit for frequency change is formed, and becomes a common signal bus through which transmission and receipt of signals are conducted among the CPU 12, the ROM 13, the RAM 14, the connectors 16, 17, the port 18 and the extended slots 19, 20.

The connector 16 is a device to connect an output device 21 required when the game soft program is operated, to the mother board 11.

Here, the output device 21 connected to the connector 16 is constructed from a liquid crystal display (see the reference number 21 in FIG. 3) and a sound output device (not shown)

such as a speaker. Instead of the liquid crystal display (see the reference number 21 in FIG. 3), a CRT display and the like may be used.

The connector 17 is a device to connect an input device required when the game soft program is operated, to the mother board 11. Here, the input device 22 is constructed from a control panel 22 (see FIG. 3) provided with a plurality of button switches (not shown). The input device 22 may include the other devices such as a keyboard, a mouse and the like, and according to contents of the game soft program, a joystick and the like may be connected to the connector 17. And in FIG. 1, although only one connector 17 is shown, if a plurality of input devices 22 are used, plural connectors 17 are provided respectively corresponding to each of the input devices 22.

And a hard disk 24 (HDD) is connected to the port 18 through a flat cable 23.

And in the hard disk 24 connected to the port 18, there are formed an operating system (OS) storing area 24a for storing the OS, an extended BIOS (Basic Input Output System) storing area 24b for storing an extended BIOS and an application storing area 24c for storing an application program which is the game soft program. Therefore, the hard disk 24 corresponds to a second memory device.

And the extended slot 19 is an insertion slot to connect a video board 25 to the mother board 11.

Here, the video board 25 connected to the mother board 11 through the extended slot 19 is a board having a graphics-accelerator to display figures and characters on the liquid crystal display (see the reference number 21 in FIG. 3) which is one of the output devices 21. The video board 25 can conduct performance with a resolution level and a graphics describing speed so that the operation of the game soft program in the information process device 1 of the embodiment can be properly executed.

And the extended slot 20 is an insertion slot to connect a sound board 26 to the mother board 11.

Here, the sound board 26 connected to the mother board 11 through the extended slot 20 is a board having a chip such as FM sound source and PCM sound source to output sounds from the speaker (not shown) which is one of the output devices 21. The sound board 26 can conduct performance so that the operation of the game soft program in the information process device 1 of the embodiment can be properly executed.

Figure 2:
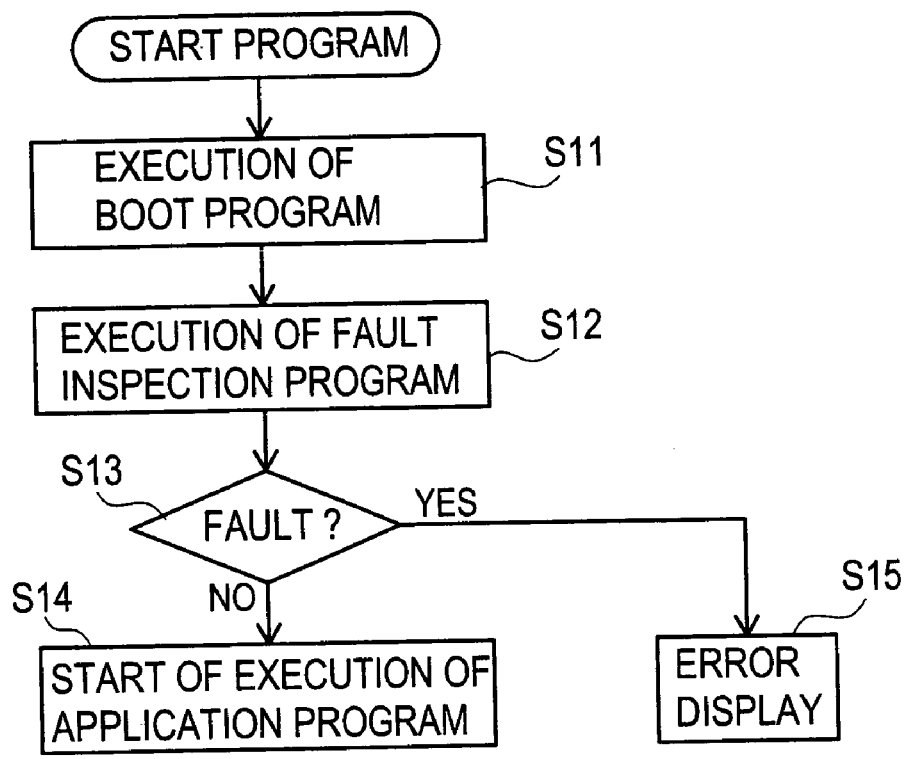
FIG. 2 is a flowchart of a start program executed when the information process device is started to operate.

Next, with reference to a flowchart shown in FIG. 2, it will be described an operation executed when the information process device 1 according to the embodiment is started to operate. FIG. 2 is a flowchart of a start program executed when the information process device 1 is started to operate.

In the information process device 1 of the embodiment, when the device 1 is started to operate, the start program stored in the start program storing area 13c of the ROM 13 is executed by the CPU 12.

That is to say, as shown in FIG. 2, when the start program is executed, at first in S11, a boot program is executed.

Here, the boot program is a program stored in the boot program storing area 13a of the ROM 13, and based on the boot program, initialization of various devices including the extended BIOS (Basic Input Output System) in the hard disk 24 and the OS (Operating System) in the hard disk 24 is executed.

At that time, since the OS (Operating System) in the hard disk 24 is loaded in the RAM 14 and started to operate, the ROM 13 may be called as a boot ROM at this point of view.

Next, when procedure of the start program shifts to S12, the fault inspection program is executed.

Here, the fault inspection program is a program stored in the fault inspection program storing area 13b and through which a fault inspection in the hard disk 24 is executed. Concretely, according to the fault inspection program, it is inspected whether or not a damage occurs in the hard disk 24 or whether or not change or falsification of the program stored in the hard disk 24 is conducted.

Next, when procedure of the start program shifts to S13, it is determined whether or not a fault occurs in the hard disk 24. This determination is conducted based on an execution result of the fault inspection program obtained in S12.

At that time, if it is determined that the fault does not occur in the hard disk 24 (S13: NO), procedure shifts to S14, thereafter the application program stored in the hard disk 24 is loaded in the RAM 14 and execution of the application program is started. On the other hand, if it is determined that the fault occurs in the hard disk 24 (S13: YES), procedure shifts to S15 and error display is conducted on the liquid crystal display (see the reference number 21 in FIG. 3) which is one of the output devices 21.

As mentioned, in the information process device 1 according to the embodiment, as shown in FIG. 1, the fault inspection program is stored in the fault inspection program storing area 13b of the ROM 13 on the mother board 11 independently from the hard disk 24, thereby even if a fault occurs in the hard disk 24 which is inspected by the fault inspection program, it can be guaranteed that the fault inspection program properly operates.

And as shown in FIG. 3, the information process device 1 of the embodiment is used as the gaming machine for business use, and as shown in FIG. 2, the fault inspection program stored in the ROM 13 is executed at the time that the information process device 1 is started to operate and the fault inspection in the hard disk 24 is executed before games are started. Therefore, measures to avoid troubles during gaming can be taken beforehand, without giving displeasure to a player of the gaming machine for business use.

Here, the present invention is not limited to the embodiment mentioned in the above and various modifications can be conducted within the scope of the present invention.

For example, as shown in FIG. 3, although the information process device 1 of the embodiment is used as the gaming machine for business use, the information process device 1 may be adopted for a personal computer on sale. In this case, the keyboard, the mouse or the joystick may be utilized as the input device, instead of the control panel 22.

And in the information process device 1 of the embodiment, although the hard disk 24 is used as the second memory device, a flash memory in which contents can be changed and stored may be used. In this case, the fault inspection program inspects whether or not a fault occurs in the flash memory.

The present invention can be adopted for the fault inspection in the information process device.

What is claimed is:

1. A gaming device configured to execute a game, the gaming device comprising:
    a first memory device for storing a boot program executed when the gaming device is started to operate;
    a mother board on which the first memory device is provided;
    a second memory device for storing a game application program for the game, the second memory device being connected to the mother board; and
    a control device for executing a fault inspection program for the gaming device to inspect whether or not a fault occurs in the second memory device and the game application program stored therein, wherein the fault inspection program is stored in the first memory device, and the control device executes the fault inspection program when the gaming device is started to operate and completes the execution of the fault inspection program before the game is started.

2. The gaming device according to claim 1, wherein the first memory device is a ROM provided on the mother board,
wherein the second memory device is a hard disk which is independent from the mother board, and
wherein the control device executes the fault inspection program stored in the ROM to inspect whether or not the fault occurs in the hard disk.

3. The gaming device according to claim 1, wherein the gaming device is configured for business use.

4. The gaming device according to claim 1, wherein the first memory device and the mother board are located in the gaming device.

5. The gaming device according to claim 1, wherein the second memory device is a flash memory.

6. A gaming device configured to execute a game, the gaming device comprising:
   a first memory device configured to store a boot program executed when the gaming device is started to operate;
   a mother board on which the first memory device is provided;
   a second memory device configured to store a game application program, the second memory device being connected to the mother board and electrically rewritable;
   a control device configured to execute a fault inspection program to inspect whether or not a fault occurs in the second memory device and the game application program stored therein;
   wherein the fault inspection program is stored in the first memory device, and the control device executes the fault inspection program every time the gaming device is started to operate and completes the execution of the fault inspection program before the game is started, and
   wherein when the fault does not occur in the second memory device the game application program is started to execute and when the fault occurs in the second memory device an error is displayed on a display device located on an exterior of the gaming device.

7. The gaming device according to claim 6,
wherein the first memory device is a ROM provided on the mother board,
wherein the second memory device is a hard disk which is independent from the mother board, and
wherein the control device executes the fault inspection program stored in the ROM to inspect whether or not the fault occurs in the hard disk.

8. The gaming device according to claim 7, further comprising:
   a RAM provided on the mother board;
   wherein the game application program is loaded from the hard disk to the RAM and executed by the control device when the fault does not occur in the hard disk.

9. The gaming device according to claim 6, wherein the display device is a liquid crystal display.

10. A gaming device configured to execute a game, the gaming device comprising:
    a first memory device for storing a boot program executed when the gaming device is started to operate;
    a mother board on which the first memory device is provided;
    a second memory device for storing a game application program for the game and a BIOS, the second memory device being connected to the mother board; and
    a control device for executing a fault inspection program for the gaming device to inspect whether or not a fault occurs in the second memory device and the game application program stored therein;
    wherein the fault inspection program is stored in the first memory device, and the control device executes the boot program to initialize the BIOS stored in the second memory device before executing the fault inspection program when the gaming device is started to operate, and completes the execution of the fault inspection program before the game is started.

* * * * *